United States Patent
Shu et al.

(10) Patent No.: US 8,676,159 B1
(45) Date of Patent: Mar. 18, 2014

(54) MOBILE NETWORK INTEROPERABILITY

(71) Applicant: Juniper Networks, Inc., Sunnyvale, CA (US)

(72) Inventors: Jesse Shu, Palo Alto, CA (US); Mingming Quan, Beijing (CN); Jinfeng Yu, Beijing (CN); Qiong Wang, Beijing (CN); Qiuyuan Liu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/631,585

(22) Filed: Sep. 28, 2012

(51) Int. Cl.
*H04M 3/16* (2006.01)

(52) U.S. Cl.
USPC ........ 455/410; 455/411; 455/412.2; 455/420; 455/421; 455/432.1; 455/435.2; 455/436; 455/561; 726/11; 726/12; 726/13; 726/14; 726/17; 370/328; 370/331; 370/466; 370/467; 370/469; 370/471

(58) Field of Classification Search
USPC ......... 370/238, 349, 400, 352, 331, 225, 477, 370/474, 405, 240, 249, 447, 521, 392, 328, 370/466, 467; 455/411, 445, 503, 518, 455/432.1, 438, 436, 410, 412.1–412.2, 455/421, 422.1, 423, 432.2, 432.3, 433, 455/439, 435.1, 435.2, 507, 561; 726/3, 15, 726/11–14, 17; 709/234, 237, 225, 247, 709/219
See application file for complete search history.

(56) References Cited

U.S. PATENT DOCUMENTS

| | | | |
|---|---|---|---|
| 6,424,638 B1 * | 7/2002 | Ray et al. | 370/331 |
| 6,839,339 B1 * | 1/2005 | Chuah | 370/349 |
| 2006/0223534 A1 * | 10/2006 | Newberg et al. | 455/436 |
| 2006/0252438 A1 * | 11/2006 | Ansamaa et al. | 455/503 |
| 2007/0259661 A1 * | 11/2007 | Hurtta et al. | 455/432.1 |
| 2008/0032729 A1 * | 2/2008 | Luo | 455/518 |
| 2010/0043068 A1 * | 2/2010 | Varadhan et al. | 726/15 |
| 2010/0128694 A1 * | 5/2010 | Choi-Grogan | 370/331 |

OTHER PUBLICATIONS

3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

(Continued)

*Primary Examiner* — Vladimir Magloire
*Assistant Examiner* — Barbar Sarwar
(74) *Attorney, Agent, or Firm* — Shumaker & Sieffert, P.A.

(57) ABSTRACT

In general, techniques are described for modifying control plane messages for subscriber sessions with a network device to add and/or modify discrete information elements and thereby conform the messages to different versions of mobile network specifications, including roaming protocols, executed by different mobile networks or by heterogeneous infrastructure elements within a mobile network. In some examples, an input network interface of a network device receives a roaming protocol message on an interface connecting a first support node of a first mobile network and a second support node of a second mobile network. A roaming protocol module of the network device modifies the roaming protocol message by adding or modifying a discrete information element to conform the roaming protocol message to a roaming protocol of the second mobile network. An output network interface of the network device sends the modified roaming protocol message to the second support node.

21 Claims, 5 Drawing Sheets

(56) References Cited

OTHER PUBLICATIONS

"3GPP TS 36.300—Evolved Universal Terrestrial Radio Access (E-UTRA) and Evolved Universal Terrestrial Radio Access Network (E-UTRAN)," Release 10, 3rd Generation Partnership Project, Technical Specification Group Radio Access Network, Jun. 2010, 183 pp.
"3GPP TS 29.060 V9.5.2—GPRS Tunneling Protocol (GTP) across the Gn and Gp interface," Release 9, Technical Specification, Feb. 2011, 162 pp.

U.S. Appl. No. 12/967,977, filed Dec. 14, 2010 entitled Multi-Service VPN Network Client for Cellular Mobile Device.
U.S. Appl. No. 12/271,605, filed Nov. 14, 2008 entitled Routing Device Having Integrated MPLS-Aware Firewall.
U.S. Appl. No. 12/905,771, filed Oct. 15, 2010 entitled Collectively Addressing Wireless Devices.
Juniper Networks, "Junos® Software, Security Configuration Guide," Release 10.1, Revision 01, Published Jun. 7, 2012, 976 pp.

* cited by examiner

MOBILE NETWORK INTEROPERABILITY

TECHNICAL FIELD

The invention relates to mobile networks and, more specifically, to communications among mobile networks.

BACKGROUND

A cellular radio access network is a collection of cells that each includes at least one base station capable of transmitting and relaying signals to subscribers' mobile nodes. A "cell" generally denotes a distinct area of a mobile network that utilizes a particular frequency or range of frequencies for transmission of data. A typical base station is a tower to which are affixed a number of antennas that transmit and receive the data over the particular frequency. Mobile nodes, such as cellular or mobile phones, smart phones, camera phones, personal digital assistants (PDAs), and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from mobile nodes into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or "mobile network," includes a core packet-switched network, a transport network, and one or more radio access networks (RANs). The core packet-switched network for the mobile network establishes logical connections, known as bearers, among the many service nodes on a path between a mobile node attached to one of the radio access networks and a packet data network (PDN). The service nodes then utilize the bearers to transport subscriber data traffic exchanged between the mobile node and the PDN, which may include, for example, the Internet, an enterprise intranet, a layer 3 VPN, and a service provider's private network. Various PDNs provide a variety of packet-based data services to mobile nodes to enable the mobile nodes to exchange service data with application or other servers of the PDNs.

The GPRS Tunneling Protocol (GTP) enables devices of one or more mobile networks to establish GTP-based tunnels for exchanging packets between service nodes (e.g., GPRS Support Nodes (GSNs)) in the mobile network backbone. In the control plane, GTP specifies a tunnel control and management protocol, GTP-C(control), which allows a service node to provide packet data network access for a mobile node associated with a subscriber. The mobile networks use GTP-C signaling to create, modify and delete GTP-U(ser data) tunnels that constitute a bearer for a subscriber session and are used by the service nodes to transport subscriber data traffic for the subscriber.

SUMMARY

In general, techniques are described for modifying roaming protocol control plane messages with a network device to add, modify, and/or delete discrete information elements and thereby conform the messages to different versions of mobile network specifications, including different versions of roaming protocols, executed by different mobile networks or by heterogeneous infrastructure elements within a mobile network. For example, a mobile node associated with a subscriber may attach (or "roam") to a visited mobile service provider network ("visited mobile network") that provides access to the home mobile service provider network ("home mobile network") of the subscriber, which anchors the subscriber session to provide packet data network access, charging/billing, and other subscriber services. The visited mobile network sends control plane messages for creating and/or updating the subscriber session for the mobile node across the network boundary with the home mobile network. A firewall or other network device logically located between the visited mobile network and the home mobile network intercepts roaming protocol control plane messages sent by the visited mobile network and adds and/or modifies discrete information elements contained in the messages before forwarding the roaming protocol control plane messages to the home mobile network. As a result, the network device configured with roaming protocol control plane message preferences for the home mobile network may conform the messages accordingly and improve interoperability between heterogeneous visited and home mobile networks. Moreover, the network device may in some cases inject information into the control messages not provided by the visited mobile network to enable the home mobile network to provide enhanced services.

In one example, a method includes receiving a roaming protocol message with a network device located on an interface connecting a first support node of a first mobile network and a second support node of a second mobile network. The method also includes modifying the roaming protocol message by adding or modifying a discrete information element to conform the roaming protocol message to a roaming protocol of the second mobile network. The method also includes sending the modified roaming protocol message to the second support node of the second mobile network.

In another example, a network device includes a control unit having a processor. The network device also includes an input network interface to receive a roaming protocol message on an interface connecting a first support node of a first mobile network and a second support node of a second mobile network. The network device also includes a roaming protocol module of the control unit to modify the roaming protocol message by adding or modifying a discrete information element to conform the roaming protocol message to a roaming protocol of the second mobile network. The network device further includes an output network interface to send the modified roaming protocol message to the second support node of the second mobile network.

In another example, a non-transitory computer-readable medium includes instructions. The instructions cause a programmable processor to receive a roaming protocol message with a network device located on an interface connecting a first support node of a first mobile network and a second support node of a second mobile network. The instructions also cause the programmable processor to modify the roaming protocol message by adding or modifying a discrete information element to conform the roaming protocol message to a roaming protocol of the second mobile network. The instructions further cause the programmable processor to send the modified roaming protocol message to the second support node of the second mobile network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
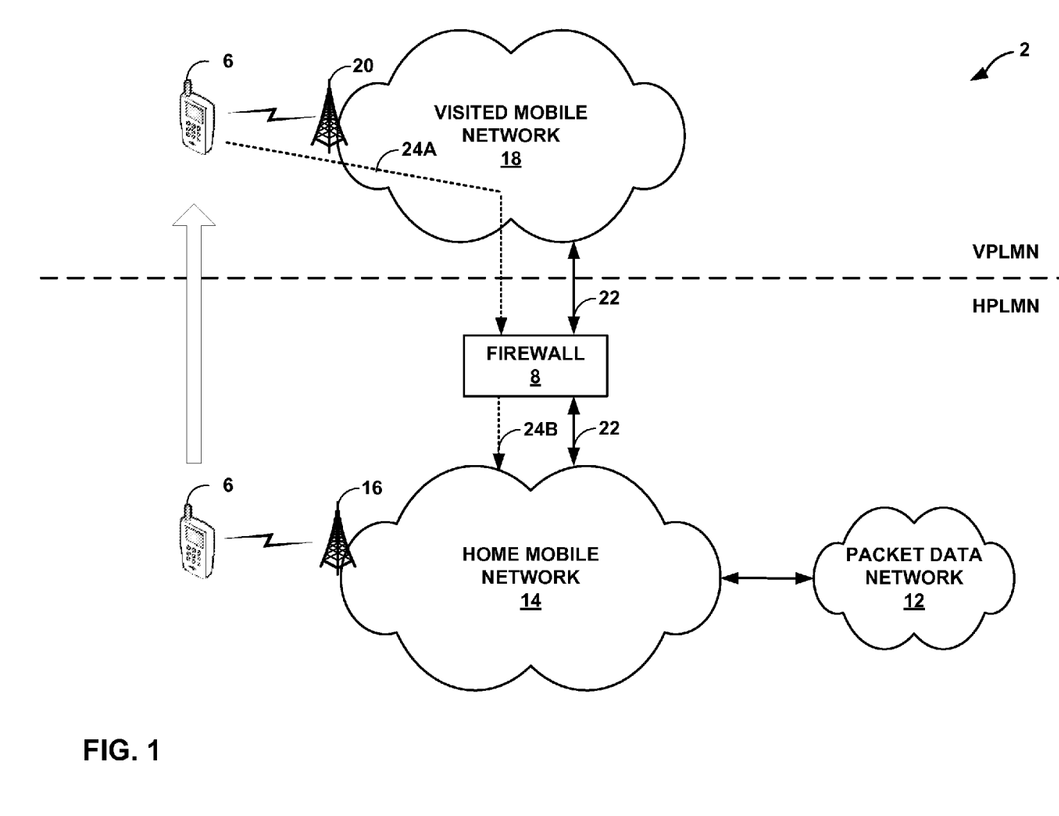
FIG. 1 is a block diagram illustrating an example network system in which a network device located on an interface between mobile networks modifies control plane messages for subscriber sessions to add and/or modify discrete information elements according to the described techniques.

FIG. 1 is a block diagram illustrating an example network system in which a network device located on an interface between mobile networks modifies control plane messages for subscriber sessions to add and/or modify discrete information elements according to the described techniques. In this example, network system 2 includes packet data network (PDN) 12 coupled to home mobile network 14 for a mobile node 6. That is, a subscriber associated with mobile node 6 subscribes to services provided by home mobile network 14, including access to a PDN 12. Packet data network 12 supports one or more packet-based services that are available for request and use by mobile node 6. As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates home mobile network 14, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Mobile node 6 is a wireless communication device that may comprise, for example, a mobile telephone, a laptop or desktop computer having, e.g., a 3G/4G wireless card, a wireless-capable netbook, a gaming device, a pager, a smart phone, a personal data assistant (PDA). Mobile node 6 may run one or more applications, such as VoIP clients, video games, videoconferencing, E-mail, and Internet browsers, among others. Certain applications running on mobile node 6 may require access to services offered by PDN 12. Mobile node 6 may also be referred to, in various architectural embodiments, as User Equipment (UE) or Mobile Stations (MS). One example of a mobile node is described in U.S. patent application Ser. No. 12/967,977 filed Dec. 14, 2010, entitled "MULTI-SERVICE VPN NETWORK CLIENT FOR CELLULAR MOBILE DEVICE," incorporated herein by reference in its entirety.

Different service providers operate home mobile network 14 and visited mobile network 18 to provide network access, data transport and other services to mobile node 6. In this respect, home mobile network 14 represents a home Public Land Mobile Network (HPLMN) and visited mobile network 18 represents a visited Public Land Mobile Network (VPLMN). In general, home mobile node 14 and visited mobile network 18 may implement any commonly defined cellular network architecture including those defined by standards bodies, such as Global System for Mobile communication (GSM) Association, a $3^{rd}$ Generation Partnership Project (3GPP), $3^{rd}$ Generation Partnership Project 2 (3GGP/2), Internet Engineering Task Force (IETF), and Worldwide Interoperability for Microwave Access (WiMAX) forum. For example, home mobile network 14 and/or visited mobile network 18 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Mobile network 4 may, alternatively or in conjunction with one of the above, implement a Code Division Multiple Access-2000 ("CDMA2000") or Enhanced Data Rates for GSM Evolution (EDGE) architecture. Home mobile network 14 and/or visited mobile network 18 may, again as an alternative or in conjunction with one or more of the above, implement a WiMAX architecture defined by the WiMAX forum.

In some examples, home mobile network 14 and/or visited mobile network 18 may comprise a core packet-switched network (not shown in FIG. 1) and one or more radio access networks (also not shown in FIG. 1, with the exception of base stations 16, 20). Core packet-switched network of home mobile network 14 and/or visited mobile network 18 may comprise, for example, a general packet radio service (GPRS) core packed-switched network, an IP-based mobile multimedia core network, or an Evolved Packet Core (EPC) or Evolved Packet System (EPS). The core packet-switched network of home mobile network 14 and/or visited mobile network 18 comprises intermediate devices required to implement the protocols of the particular architectural embodiment of home mobile network 14 and/or visited mobile network 18, such as Serving GPRS Serving Nodes (SGSNs), Serving Gateways (SGWs) and Mobility Management Entities (MMES). Mobile node 6 communicates with home mobile network 14 using a wireless communication link to base station 16 of one of the radio access networks of home mobile network 14. Mobile node 6 roams to and communicates with visited mobile network using a wireless communication link to base station 20 of one of the radio access networks of visited mobile network 18.

Radio access networks of home mobile network 14 and/or visited mobile network 18 may include, for example, a GSM Radio Access Network (GRAN), a WiMAX radio access network, a UMTS Radio Access Network (UTRAN), and/or an evolution of a UTRAN known as an E-UTRAN. In this example, a radio access network of home mobile network 14 includes base station 16 and a radio access network of visited mobile network 18 includes base station 20. Base stations 16, 20 may each be a Node B or eNode B base transceiver station that uses an air interface to communicate with user equipment in the geographic region (or "cell") that the base station serves. In some examples, either or both of base stations 16, 20 is a femtocell. In some examples, either or both of base stations 16, 20 may be another type of wireless transceiver station, such as a site controller or a WiMAX access point. Home mobile network 14 and visited mobile network 18 may each further include a backhaul or transport network (not shown) that includes land-based transmission lines, frequently leased by a service provider for the mobile network, to transport user and control traffic between mobile node 6 and a mobile gateway (not shown in FIG. 1) of the mobile network. The backhaul network also includes network devices such as aggregation devices and routers. Further details of an example mobile network are described in U.S. patent application Ser. No. 12/905,771, entitled "COLLECTIVELY ADDRESSING WIRELESS DEVICES," filed Oct. 15, 2010, the entire contents being incorporated herein by reference.

Home mobile network 14 and visited mobile network 18 establish and operate bearers to transport user traffic, in the form of PDP packet data units (PDUs), referred to hereinafter as "packets." In general, a bearer is a set of network resources and data transport functions to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Home mobile network 14 and visited mobile network 18 are connected by network links 22 that constitute, at least in part, an interface between home mobile network 14 and visited mobile network 18. The interface allows support of Packet Domain network services across areas served by the co-operating PLMNs (i.e., home mobile network 14 and visited mobile network 18). The interface may represent a Gp interface (for a UMTS architecture) or an S8 interface (for an LTE architecture), for example. Other functions of the interface connecting the co-operating PLMNs may be implemented by respective serving and gateway devices of visited mobile network 18 and home mobile network 14.

As noted above, mobile node 6 roams to visited mobile network 18 and issues roaming protocol message 24A toward visited mobile network 18 to request a subscriber session with which to receive PDN 12 services. Roaming protocol message 24A conforms to a roaming protocol that enables home mobile network 14 and visited mobile network 18 to cooperate to establish a bearer for a subscriber session for roaming mobile 6 to access PDN 12 services. One example of a roaming protocol is GPRS Tunneling Protocol (GTP).

Because visited mobile network 18 is not the home mobile network for the subscriber associated with mobile node 6, visited mobile network 18 forwards roaming protocol message 24A toward home mobile network 14 using communication links 22. While illustrated as a single message from mobile node 6 to home mobile network 14, roaming protocol message 24A may represent a plurality of messages that traverse intermediate network devices of the cooperating PLMNs to establish or update a subscriber session for mobile node 6. For example, in an LTE architecture, roaming protocol message 24A may include an initial Attach Request message issued by mobile node 6 to base station 20, which forwards the request to an MME of visited mobile network 18. The MME may incorporate information received in the Attach Request message into a first Create Session Request message that the MME then sends to an SGW of visited mobile network 18 and that is also represented by roaming protocol message 24A. The SGW generates a second Create Session Request message that incorporates information received by the SGW in the first Create Session Request. The second Create Session Request message, which is sent by the SGW to a PGW of home mobile network 14, is also represented by roaming protocol message 24A. As another example, roaming protocol message 24A may represent an Activate PDP Context Request message from mobile node 6 to an SGSN of visited mobile network 18 and a Create PDP Context Request message from the SGSN to a GGSN of home mobile network 14. Other mobile network architectures may have similar messaging schemes to attach mobile node 6 to a mobile gateway of home mobile network 14 as part of an attach procedure or other procedure to establish a requested session. In addition, the initial Attach Request or Activate PDP Context Request message may be responsive to a request by home mobile network 14 to mobile node 6 to initiate a session with home mobile network 14.

Respective devices of home mobile network 14 and visited mobile network 18 may execute different versions of the roaming protocol such that certain incompatibilities exist between the co-operating PLMNs. For example, visited mobile network 18 may operate according to a UMTS architecture, while home mobile network 14 may operate according to an LTE architecture. As another example, home mobile network 14 and visited mobile network 18 may both operate according to a UMTS architecture, but home mobile network 14 may implement a later version of the roaming protocol. Consequently, all or portions of roaming protocol message 24A may not be comprehensible to devices of home mobile network 14 due to differences in the way the PLMNs implement the roaming protocol. Alternatively or in addition, enhanced features of home mobile network 14 available to mobile node 6 may in some instances be unavailable due to the limitations of the version of the roaming protocol implemented by visited mobile network 18.

Firewall 8, logically located on the interface between home mobile network 14 and visited mobile network 18, intercepts and modifies roaming protocol message 24A to enhance interoperability between the co-operating PLMNs in accordance with techniques described in this disclosure. Firewall 8, in general, inspects packet flows between visited mobile network 18 and home mobile network 14. Such packet flows include roaming protocol messages 24A between respective core devices of visited mobile network 18 and home mobile network 14, as well as between mobile node 6 and home mobile network 14. While illustrated and described as associated with home mobile network 14 as the HPLMN, firewall 8 may in some cases be associated with visited mobile network 18 and configured with policies for home mobile network 14, as described in further detail below with respect to FIG. 3. Moreover, although the techniques are described with respect to a firewall, the techniques may be performed by any suitable network device, including an Intrusion Detection/Prevention (IDP) device, an intermediate device such as a router or switch, a border router of home mobile network 14 or visited mobile network 18, or one of the support nodes of home mobile network 14 or visited mobile network 18 (e.g., an SGSN/MME/SGW and/or a GGSN/PGW), for example.

Firewall 8 may analyze roaming protocol message 24A at the roaming layer (i.e., the layer of a network stack in which the roaming protocol operates) to identify a version of the roaming protocol to which roaming protocol message 24A conforms and/or respective versions of one or more discrete information elements carried by roaming protocol message 24A. In some cases, firewall 8 adds one or more discrete information elements to roaming protocol message 24A to generate modified roaming protocol message 24B that conforms to a version of the roaming protocol implemented by home mobile network 14. The added discrete information elements may enable home mobile network 14 to provide enhanced services. In some cases, firewall 8 modifies parameters of one or more discrete information elements already carried by roaming protocol message 24A to generate modified roaming protocol message 24B to conform the discrete information elements to the version of the roaming protocol implemented by home mobile network 14. Firewall 8 may recalculate and replace a checksum or redundancy check for the message. Firewall 8 then forwards modified roaming protocol message 24B to home mobile network 14, which creates or updates the subscriber session to carry subscriber traffic between PDN 12 and mobile node 6. In this way, firewall 8 may conform roaming protocol messages to improve interoperability despite a heterogeneous mix of network elements within visited mobile network 18 and home mobile network 14.

While described with respect to a roaming protocol message 24A that proceeds upstream (i.e., toward a mobile network gateway) (such as a Create/Update PDP Context Request or Create/Update Session Request), the techniques of this disclosure may also be applied to modify roaming protocol messages that proceeds downstream (i.e., toward mobile node 6) (such as a Create/Update PDP Context Response or Create/Update Session Response).

Figure 2:
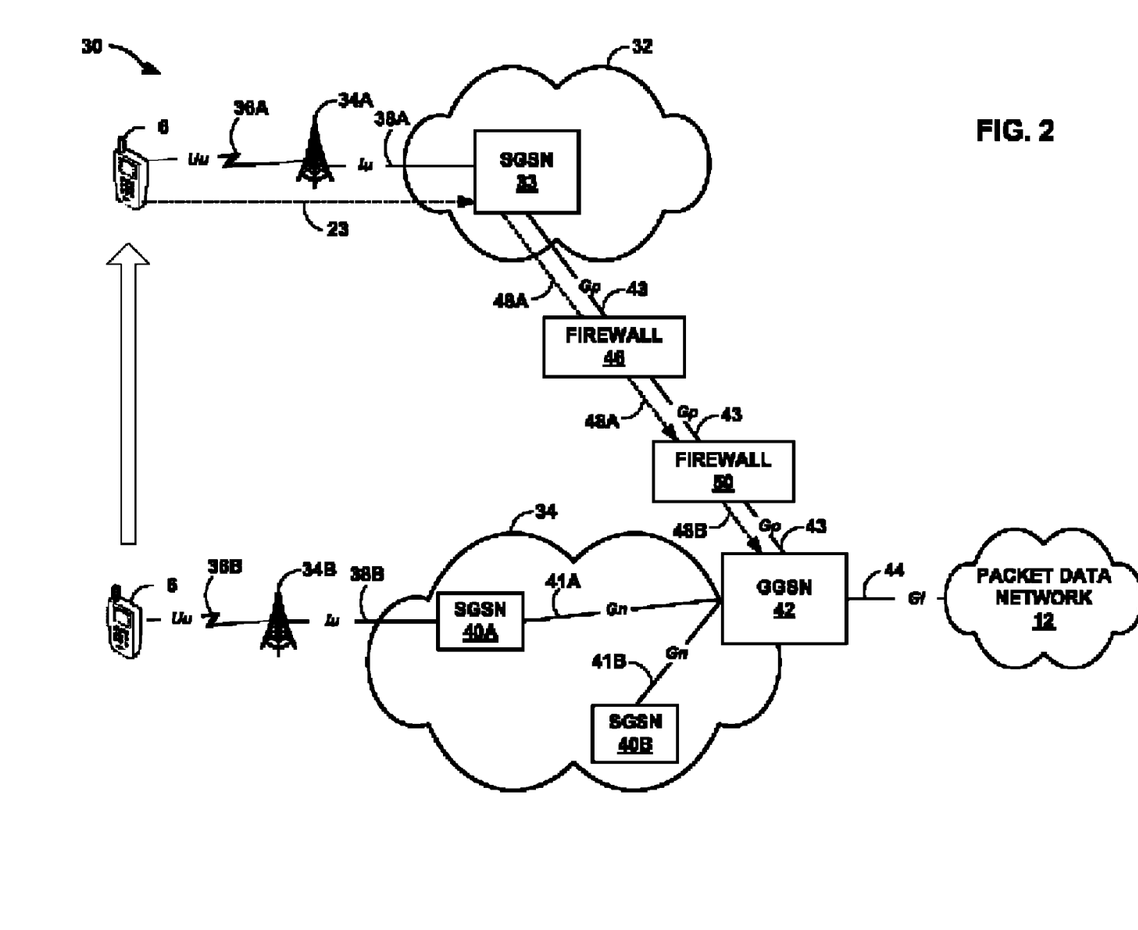
FIG. 2 is a block diagram illustrating an example network system in which network devices located on an interface between mobile networks modify control plane messages for subscriber sessions to add and/or modify discrete information elements according to the described techniques.

FIG. 2 is a block diagram illustrating an example network system in which network devices located on an interface between mobile networks modify control plane messages for subscriber sessions to add and/or modify discrete information elements according to the described techniques. In this example, network system 30 includes packet data network (PDN) 12 coupled to home mobile network 34 for mobile node 6. That is, a subscriber associated with mobile node 6 subscribes to services provided by home mobile network 34, including access to a PDN 12. Home mobile network 34 represents a GPRS network and includes Serving GPRS Support Nodes (SGSNs) 40A-40B (collectively, "SGSNs 40") as well as Gateway GPRS Support Node (GGSN) 42. Visited mobile network 32 also represents a GPRS network and includes SGSN 33. Home mobile network 34 and visited mobile network 32 may represent example instances of home mobile network 14 and visited mobile network 32, respectively.

SGSNs 40 connect to GGSN 42 by respective Gn interfaces 41A-41B. SGSN 33 of visited mobile network 32 connects to GGSN 42 of home mobile network 34 by Gp interface 43. Gp interface 43 is an interface between two GSNs in different PLMNs, in this case, between SGSN 33 of visited mobile network 32 and GGSN 42 of home mobile network 34. Gp interface 43 allows support of Packet Domain network services across areas served by the co-operating PLMNs. In alternative instances, home mobile network 34 and/or visited mobile network 32 are LTE networks or other network types and Gp interface 43 may therefore represent an S8 interface. In such instances, GGSN 42 may represent an Access Gateway (aGW) or a Packet Gateway (P-GW). While described herein with respect to one or more particular architectures for ease of illustration purposes, home mobile network 34 and visited mobile network 32 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. GGSN 42 and other elements of home mobile network 34 and visited mobile network 32 may, therefore, each represent an abstraction of devices found within any type of mobile network architectures.

SGSN 33 serves UMTS Terrestrial Radio Access Network (UTRAN) 34A by Iu interface 38A. SGSN 40A serves UTRAN 34B by Iu interface 38B. UTRANs 34A, 34B include one or more Radio Network Controllers connected to SGSNs 33, 40 by an IP network, for example. Mobile node 6 roams to a service area served by UTRAN 34A and connects to UTRAN 34A by Uu interface 36A. Mobile node 6 attaches to visited mobile network 32 by performing a GPRS Attach to SGSN 33 in order to obtain access to GPRS services. Thus, SGSN 33 serves roaming mobile node 6. Additional details regarding GPRS network architecture and functions are described in "GPRS Tunnelling Protocol (GTP) across the Gn and Gp interface," Release 9, 3rd Generation Partnership Project, Technical Specification Group Core Network and Terminals, February 2011, the entire contents being incorporated herein by reference.

Upon attaching, mobile node 6 initiates a GPRS PDP Context Activation procedure by issuing Activate PDP Context Request message 23 to SGSN 33. Mobile node 6 may provide an Access Point Name (APN) identifying a service of PDN 12 to SGSN 33 during PDP Context Activation. As part of PDP Context Activation, SGSN 33 establishes a PDP context to be used for routing subscriber data traffic for mobile node 6 with GGSN 42. More specifically, SGSN 33 identifies GGSN 42 as serving an APN for mobile node 6 and issues Create PDP Context Request 48A toward GGSN 42.

Firewall 50, logically located on Gp interface 43, provides security for home mobile network 34 by inspecting packet flows flowing between visited mobile network 32 and home mobile network 34. Firewall 46, also logically located on Gp interface 43, provides security for visited mobile network 32 by inspecting packet flows flowing between visited mobile network 32 and home mobile network 34. Firewall 50 may in some instances be integrated within GGSN 42. Moreover, although the techniques are described with respect to a firewall, the techniques may be performed by any suitable network device, including an Intrusion Detection/Prevention (IDP) device, an intermediate device such as a router or switch, a border router of home mobile network 32 or visited mobile network 34, or one of the support nodes of home mobile network 32 or visited mobile network 34 (e.g., one of SGSNs 33, 40, or GGSN 42), for example.

Create PDP Context Request 48A, as a GTP-C signaling message, may contain one or more GTP-C Information Elements that each carries a different subset of information usable by GGSN 42 for establishing a service session for mobile node 6 attached to visited mobile network 32. For example, 3GPP standards define respective Information Element types for carrying charging identifier, end user address, Radio Access Bearer context information, International Mobile Subscriber Identity (IMSI), Quality of Service profile information, and so on. "GPRS Tunnelling Protocol (GTP) across the Gn and Gp interface," incorporated above, describes a number of different Information Element types.

Firewall 50 intercepts and modifies Create PDP Context Request 48A by adding, modifying, and/or removing Information Elements contained therein to generate modified Create PDP Context Request 48B. Any such modifications may be performed, alternatively or additionally, by firewall 46. Note that while illustrated in FIG. 2 as generated by firewall 50, in other examples firewall 46 may generate Create PDP Context Request 48B, which firewall 50 may pass through to home mobile network 34 or further modify in accordance with its respective configuration.

In some examples, firewall 50 may add an "MS Time Zone" Information Element (GTP Information Element type 153) that indicates an offset between universal time and local time for where mobile node 6 is currently attached. In some examples, firewall 50 may remove an MS Time Zone Information Element carried in Create PDP Context Request 48A. In some examples, firewall 50 may modify an MS Time Zone Information Element already present in Create PDP Context Request 48A to change the offset or the Daylight Savings time value, for instance.

In some examples, firewall 50 and/or firewall 46 may add a "Private Extension" Information Element (GTP Information Element type 255) for a value-added function. For instance, firewall 46 may modify Create PDP Context Request 48A to generate modified Create PDP Context Request 48B to publish value-added services such as data encryption. Firewall 50 may receive and analyze the modified Create PDP Context Request 48B to determine that Create PDP Context Request 48B includes a Private Extension Information Element. As a result, firewall 50 and firewall 46 may cooperate to utilize the published value-added services. In the above example, firewall 50 and firewall 46 may cooperate to encrypt subscriber data traffic in the portion GTP-U tunnel that extends between firewall 50 and firewall 46. Again, firewall 50 may be incorporated within GGSN 42, and therefore encryption (or another value-added service) may extend from firewall 46 to GGSN 42.

In some examples, firewall 50 and/or firewall 46 may provide different value-added services to different providers. For example, firewall 46 may be configured with policies that, when applied to GTP-C signaling messages, direct firewall 46 to apply one set of value-added services to home mobile network 34 administered by a service provider but direct firewall 46 to apply a different set of added services to another mobile network administered by another, different service provider.

In some examples, firewall 50 and/or firewall 46 may modify one or more Information Elements already present in Create PDP Context Request 48A by modifying respective values therein, modifying flags therein, and so on, in order to generate modified Create PDP Context Request 48B. For instance, firewall 46 may modify one or more flag values within a "Common Flags" Information Element (GTP Information Element type 148). To give just one example, firewall 46 may modify a Prohibit Payload Compression bit field to direct a receiving support node (e.g., SGSN 33 or GGSN 42) or firewall 50 to perform or not perform compression in accordance with a configuration of firewall 46. This configuration may be based upon an amount of available bandwidth between SGSN 33 and GGSN 42.

Figure 3:
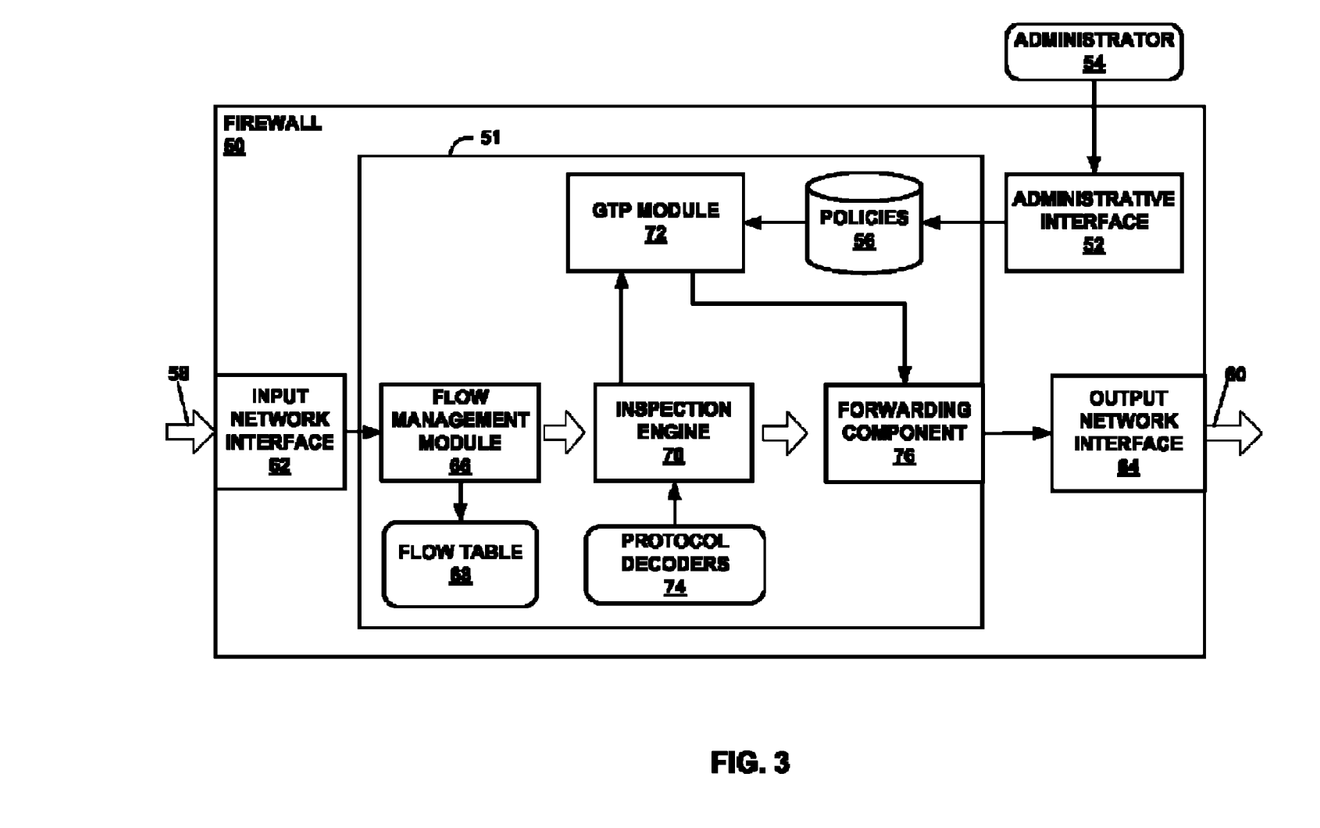
FIG. 3 is a block diagram illustrating, in further detail, an example firewall that modifies roaming protocol messages in accordance with techniques described herein.

FIG. 3 is a block diagram illustrating, in further detail, an example firewall that modifies roaming protocol messages in accordance with techniques described herein. In the example of FIG. 3, firewall 50 includes input network interface 62, control unit 51, flow management module 66, inspection engine 70, protocol decoders 74, forwarding component 76, GTP module 72, output network interface 64, flow table 68, policies 56, and administrative interface 52. Although distinct network interfaces are depicted in the example of FIG. 3, other examples may include a single network interface that performs the functions attributed to input network interface 62, output network interface 64, and/or administrative interface 52.

Administrative interface 52 presents a user interface by which administrator 54 configures firewall 50. For example, administrator 54 may configure firewall 50 with policies 56 that direct operations of firewall 50 with respect to GTP. Administrative interface 52 may include a Graphical User Interface (GUI), Command-Line Interface (CLI), or other interface by which to set and otherwise configure policies 56. Policies 56 include one or more policies applicable to roaming protocol messages, including GTP-C messages. Each of policies 56 includes an action applied by a component of firewall 50 upon the presence of an associated condition. Respective conditions of policies 56, in accordance with the techniques described in this disclosure, may match an identified service provider, a type of GTP message (e.g., a Create PDP Context Request message or Create PDP Context Response message), the presence or absence of a GTP Information Element within a GTP message, the parameters of a GTP Information Element within a GTP message, and so on. Respective actions of policies 56, in accordance with the techniques described in this disclosure, may direct GTP module 72 to modify a discrete information element of the roaming protocol message that matches the corresponding condition.

In the illustrated example, firewall 50 includes a forwarding plane that transparently monitors inbound network traffic 58 and forwards the network traffic as outbound network traffic 60. Firewall 50 may receive inbound network traffic 58 from a mobile network (e.g., visited mobile network 18 of FIG. 1) and output outbound network traffic 60 toward another mobile network (e.g., home mobile network 14 of FIG. 1). In the example illustrated by FIG. 3, the forwarding plane includes input network interface 62, flow management module 66, inspection engine 70, protocol decoders 74, forwarding component 76, and output network interface 64.

Control unit 51 of firewall 50 executes flow management module 66 and protocol decoders 36. Control unit 51 may represent any combination of hardware, firmware, and/or software for performing the functions attributed to control unit 51. For example, control unit 51 may comprise a programmable processor that executes instructions stored in a computer-readable storage medium or other non-transitory computer-readable medium. Firewall 50 may comprise a computer-readable storage medium encoded with instructions for flow management module 66 and/or protocol decoders 74. Alternatively, flow management module 66, protocol decoders 74, or other depicted components of control unit 51 may comprise discrete hardware units, such as digital signal processors (DSPs), application specific integrated circuits (ASICs), field programmable gate arrays (FPGAs), or any other equivalent integrated or discrete logic circuitry, or any combination of hardware, firmware, and/or software.

In general, flow management module 66 determines, for packets received via input network interface 62, a packet flow to which the packets belong and characteristics of the packet flow. When a packet flow is first received, flow management module 66 identifies information such as, for example, the five-tuple {source IP address, destination IP address, source port, destination port, protocol}, and in some examples, an indication of how transactions are differentiated (e.g., whether defined length transactions or delimiters used to separate transactions, which particular delimiters are used, lengths of transactions, etc.). That is, flow management module 66 receives inbound traffic 58 and identifies network flows within the traffic. Each network flow represents a flow of packets in one direction within the network traffic and is identified by at least a source address, a destination address and a communication protocol. Flow management module 66 may utilize additional information to differentiate and specify network flows including source media access control (MAC) address, destination MAC address, source port, and destination port.

Flow management module 66 maintains data within flow table 68 that describes each active packet flow present within the network traffic. Flow table 68 specifies network elements associated with each active packet flow, i.e., low-level information such as source and destination devices and ports associated with the packet flow. In addition, flow table 68 may identify pairs or groups of packet flows that collectively form a single communication session between a client and server. For example, flow table 68 may designate communication session as pairs of packet flows in opposite directions for flows sharing at least some common network addresses, ports and protocol. Flow management module 66 maintains flow table 68, which includes parameters of each packet flow monitored by firewall 50. Flow table 68 generally includes an entry for each packet flow monitored by firewall 50.

Inspection engine 70 of firewall 50 inspecting packets of a packet flow to identify a protocol for the packet flow. In general, protocol decoders 74 include a set of one or more protocol-specific software modules that process application-layer communications and output transaction data that identifies roaming protocol transactions. In particular, transaction data may identify a roaming protocol message or indicate when a series of related roaming protocol messages between two peer devices start and end. Additionally, the protocol decoders may decompose a transaction into roaming protocol layer elements, such as GTP Information Elements.

When inspection engine 70 applying protocol decoders 74 identifies a roaming protocol communication (e.g., a GTP-C message) in a packet flow, GTP module 72 applies policies 56 to the roaming protocol communication. GTP module 72 is a roaming protocol module and may represent a sub-process, library, or software plugin executing on control unit 51. Although described with respect to GTP, GTP module 72 may perform the techniques described herein with regard to other roaming protocols. GTP module 72 may in some examples be a component of a policy engine that applies policies 56 generally to packet flows specified in flow table 68. In such examples, the policy engine invokes a GTP or other roaming protocol service of GTP module 72 to apply GTP-related policies of policies 56. Respective actions of GTP-related policies 56, in accordance with the techniques described in this disclosure, may direct GTP module 72 to modify a discrete information element of the roaming protocol message that matches the corresponding condition. For example, GTP module 72 may apply policies 56 to a PDP Create Context Request message inspected by firewall 50. A matching policy may identify a missing GTP Information Element and modify the PDP Create Context Request message to add the missing GTP Information Element (e.g., an MS Time Zone Information Element). As another example, a matching policy may specify an unacceptable parameter of a GTP Information Element within the PDP Create Context Request message. As a result, GTP module 72 executes the corresponding action of the matching policy to modify the parameter to allow interoperability between mobile networks. Forwarding component 76 may then forward the modified roaming protocol message by output network interface 64.

In some firewall 50 instances, GTP module 72 programs policies 56 into the forwarding plane of firewall 50, such that inspection engine 70 or another forwarding plane component, e.g., a policy engine, applies policies 56 to inbound network traffic 58 to modify roaming protocol messages according to the described techniques. That is, firewall 50 in such instances modifies roaming protocol messages within the "fast path," rather than along the "slow path," where the slow path may include a routing and/or services plane. Additional details regarding fast path application of policies are described in U.S. patent application Ser. No. 12/271,605, entitled "ROUTING DEVICE HAVING INTEGRATED MPLS-AWARE FIREWALL," filed Nov. 14, 2008, the entire contents of which being incorporated by reference herein.

In some examples, firewall 50 represents a routing device, e.g., a router, which includes an integrated firewall for performing the techniques of this disclosure. For example, the routing device may include a routing plane and forwarding plane to operate as a high-end router, with all or some components (e.g., GTP module 72) of control plane 51 of firewall 50 integrated within the routing device (e.g., by way of one or more service cards coupled to the routing and forwarding planes) so as to use the forwarding plane in a shared, cooperative manner. In such instances, control plane 51 may program policies 56 into the forwarding plane of the router.

Figure 4A:
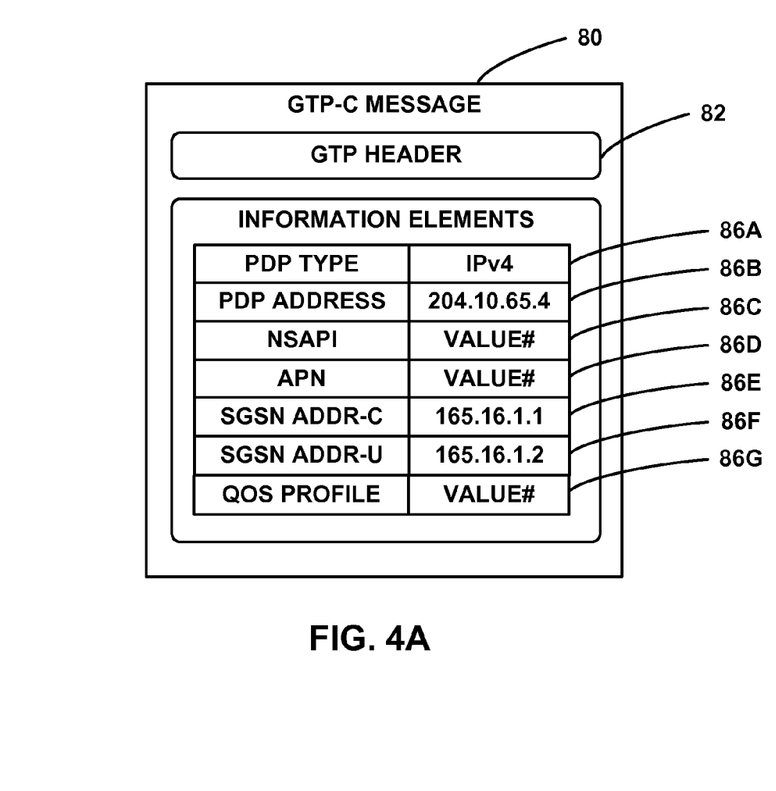
FIGS. 4A-4B are block diagrams illustrating an example modification to a GTP-C message performed by a firewall or other network device to further interoperability among mobile networks according to techniques of this disclosure.
Figure 4B:
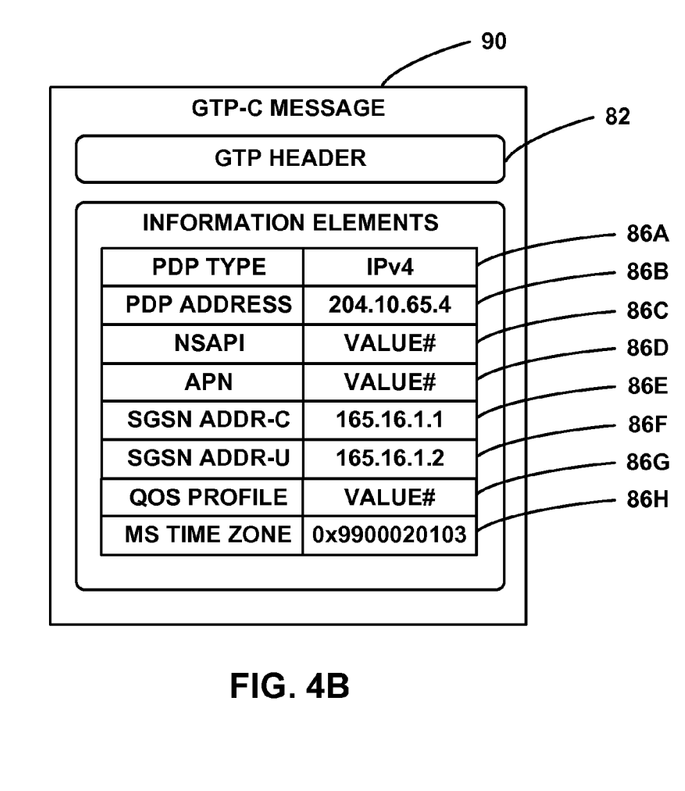

FIGS. 4A-4B are block diagrams illustrating an example modification to a GTP-C message performed by a firewall or other network device to further interoperability among mobile networks according to techniques of this disclosure. Roaming protocol message 80 of FIG. 4A is a GTP-C message that includes requisite GTP header 82 and a set of GTP Information Elements 86A-86G. Roaming protocol message 80 may represent a Create PDP Context Request message or a Create Session Request message, for example. Firewall 8 of FIG. 1, for example, may receive roaming protocol message 80 and modify roaming protocol message 80 to generate modified roaming protocol message 90 of FIG. 4B.

Modified roaming protocol message 90 includes an additional GTP Information Element 86H added by firewall 8 to provide additional information to home mobile network 14. In particular, GTP Information Element 86H is an MS Time Zone Information Element that indicates the time zone of mobile node requesting an active PDP context. In various examples, modified roaming protocol message 90 may differ from roaming protocol message 80 by having one or more modified GTP Information Elements, one or more additional GTP Information Elements, and/or one or more GTP Information Elements no longer present (i.e., removed) due to operations by a firewall or other network device operating according to techniques described herein.

Figure 5:
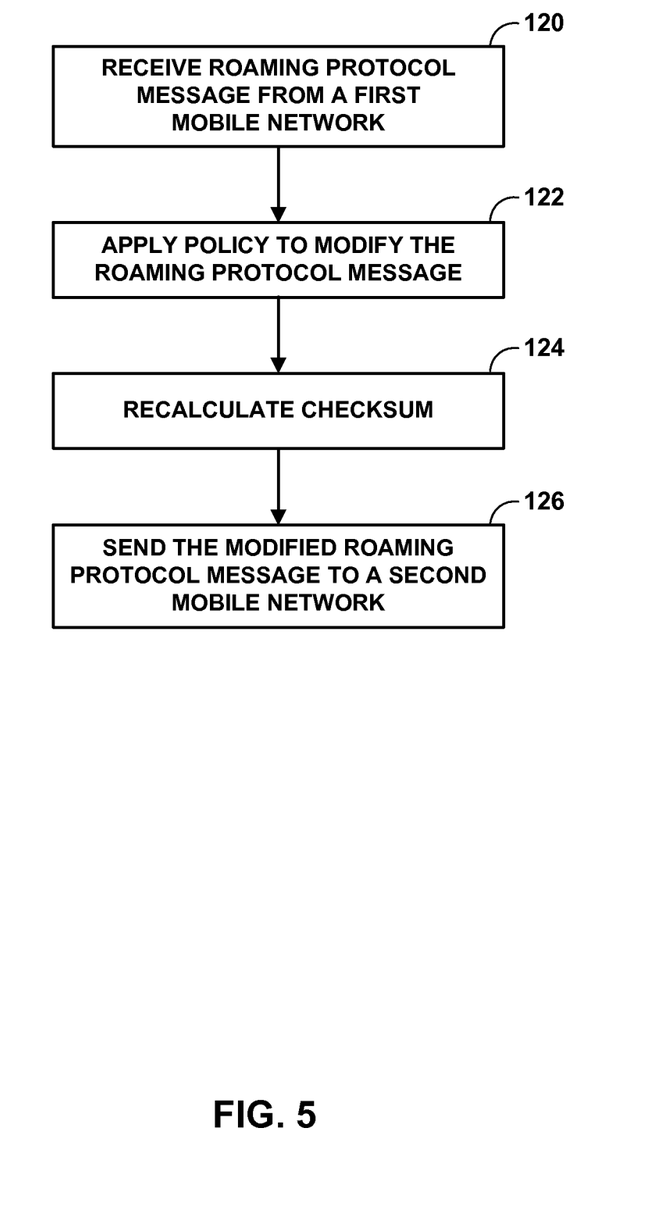
FIG. 5 is a flowchart illustrating an example mode of operation for a firewall operating in accordance with techniques described in this disclosure.

FIG. 5 is a flowchart illustrating an example mode of operation for a firewall operating in accordance with techniques described in this disclosure. The example mode of operation is described with respect to firewall 8 and other elements of network system 2 of FIG. 1.

Firewall 8 logically located on an interface coupling visited mobile network 18 and home mobile network 14 receives a roaming protocol message from visited mobile network 18 (120). Firewall 8 applies a configured policy having a condition that matches characteristics of the roaming protocol message to modify the roaming protocol to generate a modified roaming protocol message (122). Firewall 8 recalculates a checksum for the modified roaming protocol message for consistency (124) and then sends the modified roaming protocol message to home mobile network 14 (126).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   intercepting, by a firewall device positioned between a first support node of a first mobile network and a second support node of a second mobile network to inspect packet flows that traverse a network boundary between the first mobile network and the second mobile network, a roaming protocol control plane message originated by the first support node and directed to the second support node to request that the second mobile network establish a subscriber session for a mobile node connected to the first mobile network and associated with a subscriber;
   generating, with the firewall device, a modified roaming protocol control plane message by modifying the intercepted roaming protocol control plane message to add a discrete information element to or modify a discrete information element of the intercepted roaming protocol control plane message, wherein the intercepted roaming protocol control plane message conforms to a roaming protocol of the first mobile network, and wherein the modified roaming protocol control plane message generated by the firewall device conforms to a roaming protocol of the second mobile network but does not conform to the roaming protocol of the first mobile network, and wherein the discrete information element includes information usable by the second mobile network for establishing the subscriber session; and
   sending the modified roaming protocol control plane message to the second support node of the second mobile network.

2. The method of claim 1, wherein the roaming protocol comprises General Packet Radio Service Tunneling Protocol (GTP).

3. The method of claim 1, wherein modifying the roaming protocol control plane message comprises applying a policy configured on the firewall device.

4. The method of claim 3,
   wherein the firewall device stores one or more policies configured for respective one or more mobile networks, wherein the policy is configured for the second mobile network, and
   wherein applying the policy comprises identifying the second mobile network and identifying the policy configured for the second mobile network from among the one or more policies.

5. The method of claim 4,
   wherein identifying the second mobile network comprising identifying the second mobile network using an access point name of the roaming protocol control plane message.

6. The method of claim 3,
   wherein the firewall device stores one or more policies configured for respective one or more mobile networks, wherein the policy is configured for the first mobile network, and
   wherein applying the policy comprises identifying the first mobile network and identifying the policy configured for the first mobile network from among the one or more policies.

7. The method of claim 1,
   wherein adding the discrete information element comprises adding a General Packet Radio Service Tunneling Protocol (GTP) Information Element that is not supported by the first support node.

8. The method of claim 1,
   wherein modifying the discrete information element comprises modifying a parameter of a General Packet Radio Service Tunneling Protocol (GTP) Information Element included in the roaming protocol control plane message.

9. The method of claim 8,
   wherein the GTP Information Element is a Common Flags Information Element and the parameter comprises a Prohibit Payload Compression flag of the Common Flags Information Element.

10. The method of claim 1, wherein the firewall device comprises a service card that stores one or more policies configured for respective one or more mobile networks, the method further comprising:
- programming one or more policies with the service card into a forwarding plane of the firewall device,
- wherein modifying the roaming protocol control plane message comprises applying the one or more policies to the roaming protocol control plane message in the forwarding plane.

11. A firewall device that inspects packet flows that traverse a network boundary between a first mobile network and a second mobile network, the firewall device comprising:
- a control unit comprising a processor;
- an input network interface to intercept a roaming protocol control plane message on an interface connecting a first support node of the first mobile network and a second support node of the second mobile network, wherein the roaming protocol control plane message originated from the first support node and is directed to the second support node to request that the second mobile network establish a subscriber session for a mobile node connected to the first mobile network and associated with a subscriber;
- a roaming protocol module of the control unit to generate a modified roaming protocol control plane message by modifying the intercepted roaming protocol control plane message to add a discrete information element or modify a discrete information element of the intercepted roaming protocol control plane message, wherein the intercepted roaming protocol control plane message conforms to a roaming protocol of the first mobile network, and wherein the modified roaming protocol control plane message conforms to a roaming protocol of the second mobile network but does not conform to the roaming protocol of the first mobile network, and wherein the discrete information element includes information usable by the second mobile network for establishing the subscriber session; and
- an output network interface to send the modified roaming protocol control plane message to the second support node of the second mobile network.

12. The firewall device of claim 11, wherein the roaming protocol comprises General Packet Radio Service Tunneling Protocol (GTP).

13. The firewall device of claim 11, wherein the roaming protocol module modifies the roaming protocol control plane message by applying a policy configured on the firewall device.

14. The firewall device of claim 13, further comprising:
- one or more policies configured for respective one or more mobile networks, wherein the policy is configured for the second mobile network,
- wherein the roaming protocol module applies the policy by identifying the second mobile network and identifying the policy configured for the second mobile network from among the one or more policies.

15. The firewall device of claim 14,
- wherein the roaming protocol module identifies the second mobile network by identifying the second mobile network using an access point name of the roaming protocol control plane message.

16. The firewall device of claim 13, further comprising:
- one or more policies configured for respective one or more mobile networks, wherein the policy is configured for the first mobile network,
- wherein the roaming protocol module applies the policy by identifying the first mobile network and identifying the policy configured for the first mobile network from among the one or more policies.

17. The firewall device of claim 11,
- wherein the roaming protocol module adds the discrete information element by adding a General Packet Radio Service Tunneling Protocol (GTP) Information Element that is not supported by the first support node.

18. The firewall device of claim 11,
- wherein the roaming protocol module modifies the discrete information element by modifying a parameter of a General Packet Radio Service Tunneling Protocol (GTP) Information Element included in the roaming protocol control plane message.

19. The firewall device of claim 18,
- wherein the GTP Information Element is a Common Flags Information Element and the parameter comprises a Prohibit Payload Compression flag of the Common Flags Information Element.

20. The firewall device of claim 11, further comprising:
- a forwarding plane; and
- a firewall having a service card that stores one or more policies configured for respective one or more mobile networks,
- wherein the service card programs one or more policies into the forwarding plane, and
- wherein the forwarding plane modifies the roaming protocol control plane message by applying the one or more policies to the roaming protocol control plane message.

21. A non-transitory computer-readable medium comprising instructions for causing one or more programmable processors to:
- intercept, by a firewall device positioned between a first support node of a first mobile network and a second support node of a second mobile network to inspect packet flows that traverse a network boundary between the first mobile network and the second mobile network, a roaming protocol control plane message originated by the first support node and directed to the second support node to request that the second mobile network establish a subscriber session for a mobile node connected to the first mobile network and associated with a subscriber;
- generate, with the firewall device, a modified roaming protocol control plane message by modifying the intercepted roaming protocol control plane message to add a discrete information element or modify a discrete information element of the intercepted roaming protocol message, wherein the intercepted roaming protocol control plane message conforms to a roaming protocol of the first mobile network, and wherein the modified roaming protocol message conforms to a roaming protocol of the second mobile network but does not conform to the roaming protocol of the first mobile network, and wherein the discrete information element includes information usable by the second mobile network for establishing the subscriber session; and
- send the modified roaming protocol control plane message to the second support node of the second mobile network.

* * * * *